(12) United States Patent
Caracci et al.

(10) Patent No.: US 6,571,033 B2
(45) Date of Patent: May 27, 2003

(54) OPTICAL SIGNAL DEVICE

(75) Inventors: Stephen J. Caracci, Corning, NY (US); Sean M. Garner, Elmira, NY (US); Xuequn Hu, Cincinnati, OH (US); Edward L. Jones, Cincinnati, OH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/966,941

(22) Filed: Sep. 28, 2001

(65) Prior Publication Data

US 2003/0063844 A1 Apr. 3, 2003

(51) Int. Cl.⁷ .............................. G02B 6/293; G02B 6/26
(52) U.S. Cl. .............................. 385/24; 385/36; 385/47; 385/48
(58) Field of Search ............................ 385/15, 24, 31, 385/36, 39, 47, 48

(56) References Cited

U.S. PATENT DOCUMENTS

| | | | | |
|---|---|---|---|---|
| 4,244,045 A | | 1/1981 | Nosu et al. ...................... 370/3 |
| 4,701,012 A | * | 10/1987 | Kaiser ........................ 385/47 X |
| 4,805,977 A | * | 2/1989 | Tamura et al. ................. 385/47 |
| 4,824,200 A | | 4/1989 | Isono et al. ..................... 385/24 |
| 5,005,935 A | | 4/1991 | Kunikane et al. ............ 359/129 |
| 5,515,194 A | * | 5/1996 | Kanterakis et al. ........ 385/36 X |
| 5,583,683 A | | 12/1996 | Scobey ......................... 359/127 |
| 5,835,517 A | | 11/1998 | Jayaraman et al. ............ 372/50 |
| 5,859,717 A | | 1/1999 | Scobey et al. ............... 359/124 |
| 5,905,827 A | | 5/1999 | Naganuma et al. ............ 385/31 |
| 6,031,952 A | * | 2/2000 | Lee ............................... 385/47 |
| 6,118,912 A | | 9/2000 | Xu .................................. 385/24 |
| 6,181,850 B1 | | 1/2001 | Nakamura et al. ............. 385/33 |
| 6,198,864 B1 | | 3/2001 | Lemoff et al. ................. 385/47 |
| 6,201,908 B1 | | 3/2001 | Grann .......................... 385/24 |
| 6,212,312 B1 | | 4/2001 | Grann et al. ................... 385/24 |
| 6,219,470 B1 | | 4/2001 | Tu ................................ 385/14 |

FOREIGN PATENT DOCUMENTS

| | | |
|---|---|---|
| EP | 0 153 722 | 9/1985 |
| JP | 61-270709 | 12/1986 |
| JP | 63-296006 | 12/1988 |
| JP | 64-57214 | 3/1989 |
| JP | 2-118503 | 5/1990 |
| JP | 4-361208 | 12/1992 |

* cited by examiner

*Primary Examiner*—John D. Lee
(74) *Attorney, Agent, or Firm*—James V. Suggs

(57) ABSTRACT

The present invention is an optical signal device having transceiver elements and interference filters held in a transparent mounting structure. The interference filters are deposited onto prisms, and may be individually held in the mounting structure, or assembled together as a subassembly. The present invention is especially useful as a transceiver for local area network and fiber to the home applications.

26 Claims, 13 Drawing Sheets

OPTICAL SIGNAL DEVICE

BACKGROUND OF THE INVENTION

1. Field of the Invention

The present invention relates generally to the field of optical communications, and more particularly to an optical wavelength multiplexer, demultiplexer, or transceiver.

2. Technical Background

In a wavelength division multiplexed optical system, independent optical signals from several sources, each having a different central wavelength, are combined and introduced into a single optical fiber. In this fashion, the data transmission capacity of the optical fiber is increased by a factor equal to the number of multiplexed signals. The multiplexed signals may be separated into the independent wavelength signals by a device known as a demultiplexer. Demultiplexers generally use wavelength-selective optical elements such as diffraction gratings or interference filters to separate a demultiplexed optical signal into its component wavelengths.

For use in local area network and fiber to the home applications, small, inexpensive multiplexing and demultiplexing components are required. To provide devices with reduced cost and a high level of integration and miniaturization, molded plastic bodies having integral mirrors and lenses may be combined with interference filters. One such device is described in U.S. Pat. No. 6,198,864, granted to Lemoff et al. This device includes a molded optical body having a relay arrangement of reflective focusing lenses, and a plurality of wavelength-specific filters connected to an output of the body. A multiplexed optical signal is introduced into the molded optical body, propagates in a zig-zag fashion between the reflective focusing lenses and the filters, with one wavelength being transmitted through each filter to a detector. This device relies on reflections to guide the optical signals between interference filters. With each reflection, however, the optical signal can suffer beam distortion and misalignment as well as absorption and scattering loss, leading to decreased performance of the device. Also, as this device is about 7 mm in length, optical signals must traverse at least that distance in the molded optical body, leading to non-negligible absorption losses in the molded material.

Another device is described in U.S. Pat. No. 6,201,908, to Grann. This device has a molded optical body including a collimating lens for an input fiber, and an optical block with a flat, reflective upper surface, and a flat lower surface having a plurality of interference filters carried thereon. In this device, a multiplexed optical signal is collimated by the collimating lens, and is introduced into the optical block, where it propagates in a zig-zag fashion between the reflective upper surface and the filters, with one wavelength being transmitted through each filter into the molded optical body, where it passes through a molded focusing lens into a detector. This device also relies on multiple reflections to guide the optical signals to the interference filters, incurring loss at every reflection.

U.S. Pat. No. 6,219,470, granted to Tu, describes a multiplexing transmitter and receiver utilizing a micromachined silicon substrate as the mounting platform for discrete optical components and optoelectronic devices. This device requires photolithographic processing, as well as the fabrication and alignment of collimating lenses. In this device, there are several air/dielectric boundaries in the optical path, causing significant loss due to reflection.

Notwithstanding the current availability of transceiver components, there remains a need for low-cost integrated transceiver components for local area network and fiber to the home applications. The devices must be inexpensive to fabricate and assemble, must be highly stable to temperature fluctuations, and must be adaptable to a wide range of transmitted and received wavelengths.

SUMMARY OF THE INVENTION

One aspect of the present invention is an optical device for use with at least one optical signal, each optical signal having a wavelength within a unique wavelength band. The optical device includes at least three transceiver elements, each transceiver element being operatively coupled to a lensing element, and each transceiver element emitting at least one of the optical signals, receiving at least one of the optical signals, or both. The optical device further includes a filter subassembly having at least one prism, each prism having at least one substantially flat face, and at least one interference filter, each interference filter being deposited on one of the substantially flat faces of one of the prisms, each interference filter being selective between two of the unique wavelength bands of the optical signal. The optical device further includes a transparent mounting structure having at least one transceiver element alignment feature, each transceiver element being held in one of the transceiver element alignment features, and a filter subassembly alignment feature, the filter subassembly being held in the filter subassembly alignment feature. Each optical signal is coupled from one of the transceiver optical elements to another of the transceiver optical elements by at least one of the interference filters.

Another aspect of the present invention is an optical device for use with a plurality of optical signals, each optical signal having a wavelength within a unique wavelength band. The optical device includes at least three transceiver elements, each transceiver element being operatively coupled to a lensing element, and each transceiver element emitting at least one of the optical signals, receiving at least one of the optical signals, or both. The optical device further includes at least one prism, each prism having at least one substantially flat face. The optical device further includes at least one interference filter, each interference filter being deposited on one of the substantially flat faces of one of the prisms, each interference filter being selective between two of the unique wavelength bands of the optical signal. The optical device further includes a transparent mounting structure having at least one transceiver element alignment feature, each transceiver element being held in one of the transceiver element alignment features, and at least one prism alignment feature, each prism being held in one of the prism alignment features. Each optical signal is coupled from one of the transceiver elements to another of the transceiver elements by at least one of the interference filters.

The devices of the present invention have many advantages over the prior art. The devices can operate as multiplexers, demultiplexers or transceivers. Reflections between interference filters are minimized, reducing losses due to reflection in the device. The path length of the optical signal in the mounting structure is minimized, reducing crosstalk and losses due to absorption losses in the mounting structure. Minimization of path length may also reduce scattering losses due to haze in the material of the mounting structure. The devices can be designed to have good performance over a wide range of temperatures. The devices of the present invention may be upgraded for different wavelengths or data rates without tool redesign. Further, the devices of the present invention can be fabricated and assembled using low-cost techniques, making them attractive for applications such as local area networks and fiber to the home.

Additional features and advantages of the invention will be set forth in the detailed description which follows, and in part will be readily apparent to those skilled in the art from that description of recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate the various embodiments of the invention, and together with the description serve to explain the principles and operation of the invention.

DETAILED DESCRIPTION OF THE INVENTION

Figure 1:
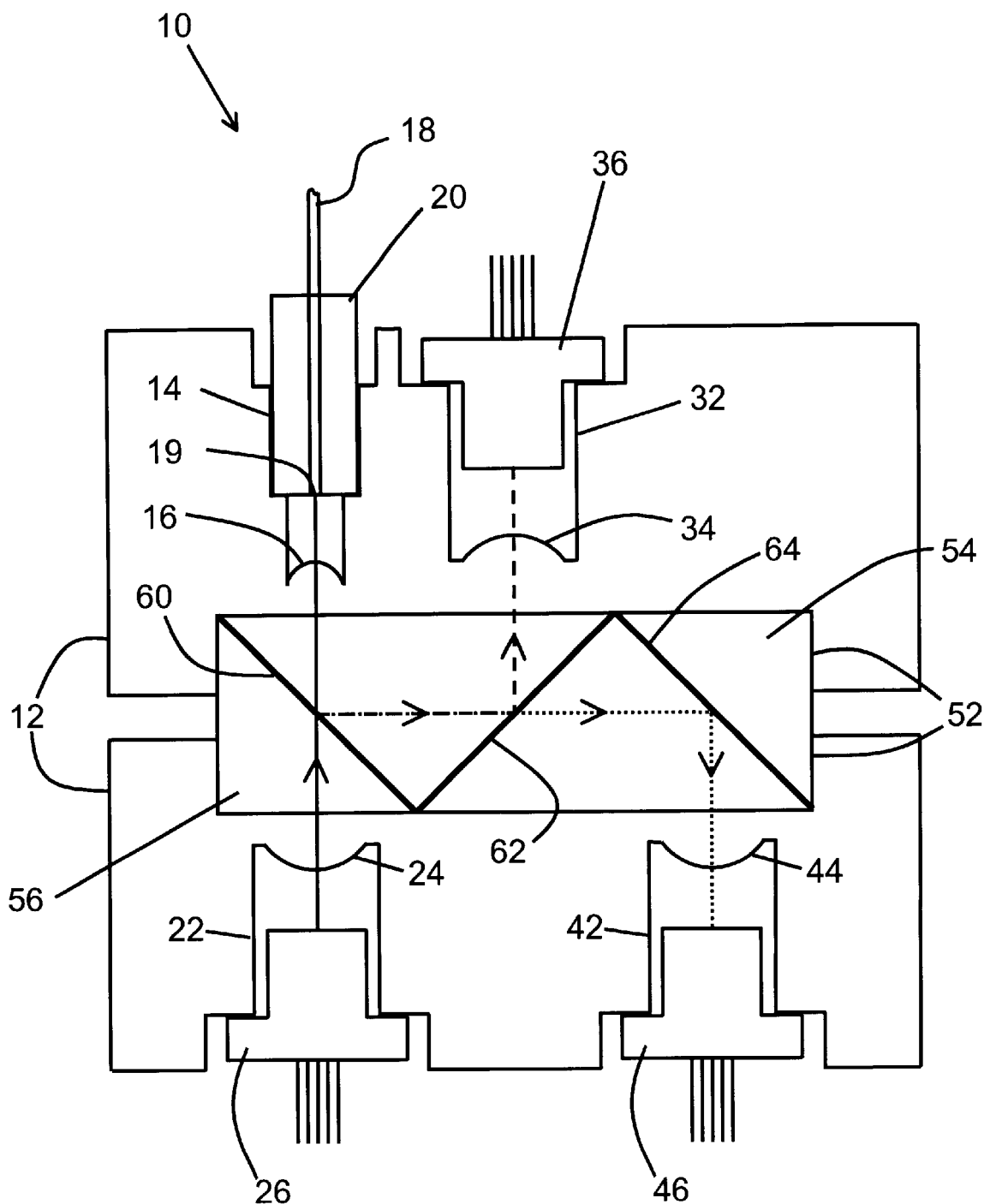
FIG. 1 is a cross-sectional view of an optical transceiver having three interference filters.

Reference will now be made in detail to the present preferred embodiments of the invention, examples of which are illustrated in the accompanying drawings. Wherever possible, the same reference numerals will be used throughout the drawings to refer to the same or like parts.

The optical devices of the present invention are optical multiplexers, demultiplexers, and transceivers constructed from transparent mounting structures which hold transceiver elements and prisms having interference filters deposited thereon. As used herein, a transceiver element is an optical element that emits an optical signal, receives an optical signal, or both. Examples of transceiver elements include a single mode optical fiber, a multimode optical fiber, a planar waveguide, a laser such as a diode laser, a light emitting diode, and a photodetector such as a photodiode detector. Each transceiver element is held in alignment with a lensing element, which serves to keep the beam size of the optical signals small (less than about 3 mm), and to focus the beams onto the transceiver elements. The lensing elements can be, for example, collimating elements or converging lenses. The lensing elements can be held in separate alignment features in the mounting structure, can be affixed directly to the transceiver elements, or can be molded directly into the mounting structure itself. Each transceiver element may be said to be operatively coupled to one of the lensing elements. Multiple transceiver elements may be operatively coupled to a single lensing element.

The devices are designed to be used with at least one optical signal, each optical signal having a wavelength within a wavelength band not overlapping with any other wavelength band used in the device. As such, the optical signal can be said to have a wavelength within a unique wavelength band. The mounting structure arranges the prism-deposited interference filters and the transceiver elements such that each optical signal is coupled from one of the transceiver optical elements to another of the transceiver optical elements by at least one of the interference filters. This coupling can be by transmission, reflection, or a combination of the two.

One exemplary aspect of the present invention is a low-cost, environmentally stable transceiver for use in local area networks and fiber to the home applications. As an exemplary application for such devices, the present disclosure will consider a fiber to the home network having a single channel transmitted from the device to the network. The transmitted optical signal includes wavelengths in a transmitted wavelength band, which includes wavelengths between about 1260 nm and about 1360 nm. The transmitted channel is an asynchronous transfer mode channel, operating at about 155 Mb/s and a power of about 0 dBm. The network has two channels received by the device from the network. The received wavelength band includes wavelengths between about 1480 and about 1560 nm. A first received optical signal has wavelengths in a first sub-band of the received wavelength band, which includes wavelengths between about 1480 nm and about 1510 nm. This channel is an asynchronous transfer mode (ATM) channel, operating at 622 Mb/s, with a power between about −10 and −30 dBm. A second received optical signal is in a second sub-band of the received wavelength band, which includes wavelengths between about 1550 nm and about 1560 nm. This channel is an analog channel, operating between about 50 and about 870 MHz, with a power between about 0 and about −6 dBm. As the skilled artisan will appreciate, the present invention is not limited to use with the specific communication protocols, channel wavelengths, bit rates, and powers used as examples herein. Devices for use with different numbers and types of transmitted and received channels may be constructed by judicious choice, design and assembly. Further, devices functioning solely as multiplexers or demultiplexers may be constructed by the skilled artisan in view of the present disclosure.

A first embodiment of the present invention is shown in cross-section in FIG. 1. Transceiver 10 is built using mounting structure 12. The mounting structure 12 is formed from a transparent material, and may be of a single piece, or in multiple pieces. For example, in the embodiment shown in FIG. 1, the mounting structure 12 is in two pieces. The mounting structure is preferably formed from a polymer with high glass transition temperature and a relatively low optical loss (less than 1 dB/cm) at the wavelengths to be used in the transceiver. The mounting structure may be formed from many different materials. For example, suitable materials include polycarbonates such as poly(bisphenol A carbonate), available from General Electric of Schenectady, N.Y. as Lexan™; polyetherimides such as poly[(1,3-dihydro-1,3-dioxo-2H-isoindole-5,2-diyl)-1,3-phenylene(1,3-dihydro-1,3-dioxo-2H-isoindole-2,5-diyl)oxy-1,4-phenylene(1-methylethylidene)-1,4-phenyleneoxy], available from General Electric of Schenectady, N.Y. as Ultem™ 1010; and cyclic olefin copolymers, such as poly (ethylene-co-norbornene), available from Ticona, of Summit, N.J. as Topas™. The mounting structure may be injection molded, cast from a mold, embossed or formed in other ways familiar to the skilled artisan. The mounting structure may also be formed from glass using methods known to the person of skill in the art.

The mounting structure 12 integrally includes alignment features for various transceiver elements. In the embodiment shown in FIG. 1, one of the transceiver element alignment features is a ferrule alignment feature 14 formed in mounting structure 12. An input collimating element 16 is formed directly in the mounting structure 12. One of the transceiver elements is an input optical fiber 18 having an end 19 is held in a ferrule 20, which is held in ferrule alignment feature 14 in alignment with the input collimating element 16. An optical signal emerging from the end of the input optical fiber will be collimated by the input collimating element; thus, the input collimating element is said to be operatively coupled to the end of the input optical fiber. Preferably, the alignment of the ferrule-held fiber is passive, such that mere insertion of the ferrule fully into the alignment feature is sufficient to achieve the desired alignment. Once in place, the ferrule may be affixed by an adhesive, or using other techniques known in the art, such as ultrasonic welding and RF welding.

The mounting structure 12 also includes as one of the transceiver element alignment features an optical signal source alignment feature 22. A source collimating element 24 is formed directly in the mounting structure 12. Another of the transceiver elements of the device is an optical signal source 26. The optical signal source 26 is held in the alignment feature 22, such that the optical signal source is operatively coupled to the source collimating element. The optical signal source may be a diode laser, as is shown in FIG. 1, or may alternatively be an optical fiber held in a ferrule. The optical signal source emits the transmitted optical signal and therefore must be operative in the transmitted wavelength band. The optical signal source must be aligned such that the transmitted optical signal is coupled into the input optical fiber 18. If the optical signal source has a very well-defined geometry, then passive alignment by the alignment feature 22 may be sufficient to ensure coupling of the transmitted optical signal into the input optical fiber. However, inexpensive, commercially available packaged laser diodes, such as Model No. ML725B8F-01, available from Mitsubishi Electric & Electronics USA, Inc., Sunnyvale, Calif., do not have precisely defined package sizes and are not necessarily well-centered in their packages. When using such optical signal sources, active alignment of the optical signal source in the optical signal source alignment feature 22 may be necessary. For example, when using a laser diode and lensing system which create a Gaussian beam with a mode field diameter of 3 µm, alignment within ±2.5 µm is necessary to keep optical signal source alignment losses below about 2 dB. Thus, the alignment feature 22 shown in FIG. 1 is oversized, allowing for optimization of the position of the optical signal source 26 in the alignment feature 22. The optical signal source 26 may be affixed after alignment using an adhesive, ultrasonic welding, or RF welding.

The mounting structure 12 also includes as transceiver element alignment features first receiver alignment feature 32 and a second receiver alignment feature 42. A first and a second receiver collimating element (34 and 44) are formed directly in the mounting structure. Two more transceiver elements, first receiver 36 and second receiver 46, are held in alignment features 32 and 42, respectively. The receivers 36 and 46 may be optoelectronic elements such as photodiode detectors, and serve to convert the optical signals into electronic signals for use in electronic devices. Optoelectronic detectors.may be individually packaged, as shown in the embodiment exemplified in FIG. 1, or may be integrated on a single substrate. Alternatively, the receivers 36 and 46 may be optical elements such as, for example, single or multimode optical fibers or coupling lenses, and serve to relay the optical signals to another optical device for further processing. The first receiver 36 is operatively coupled to the first receiver collimating element 34, and the second receiver 46 is operatively coupled to the second collimating element 44. The first receiver is positioned to receive the first received optical signal, while the second receiver is positioned to receive the second received optical signal. If the receivers have well-defined geometries, then passive alignment in alignment features 32 and 42 may be sufficient to ensure coupling of the received optical signals with the receivers. However, inexpensive, commercially available packaged photodiode detectors, such as Model No. PD7088-01 available from Mitsubishi Electric & Electronics USA, Inc., Sunnyvale, Calif., do not have precisely defined package sizes and are not necessarily well-centered in their packages. When using such receivers, active alignment of the receivers in the alignment features 32 and 42 may be necessary. For example, when using a photodiode detector with an active area 40 µm in diameter, alignment within ±15 µm is necessary to keep photodiode detector alignment losses below about 0.5 dB. Thus, the alignment feature 32 and 42 shown in FIG. 1 are oversized, allowing for optimization of the position of the receivers 36 and 46 in the alignment features 32 and 42. The receivers may be affixed after alignment using an adhesive, ultrasonic welding, RF welding, or by other methods familiar to the skilled artisan.

The lensing elements of the present invention are shown in the FIGS. as spherical lenses formed directly in the transparent mounting structure. As the skilled artisan will appreciate, other lensing elements may be used in the present invention. For example, the lenses may be aspheric, or include superimposed diffractive features. Alternatively, a GRIN lens, ball lens, or plano-convex lens may be affixed into the alignment features. The lensing elements may be affixed directly to the optical or optoelectronic element to which they are coupled. For example, an optical fiber with an integral lens may be used as a transceiver element. Likewise, a laser diode or photodiode detector may have a collimating lens integrally included in its package. The external surfaces of the lensing elements may be coated with an antireflective coating, as would be apparent to one of skill in the art. The lensing elements may be athermalized using techniques familiar to the skilled artisan. For example, a diffractive element formed on the lensing element may be used to athermalize the focal point of the lensing element.

Figure 1A:
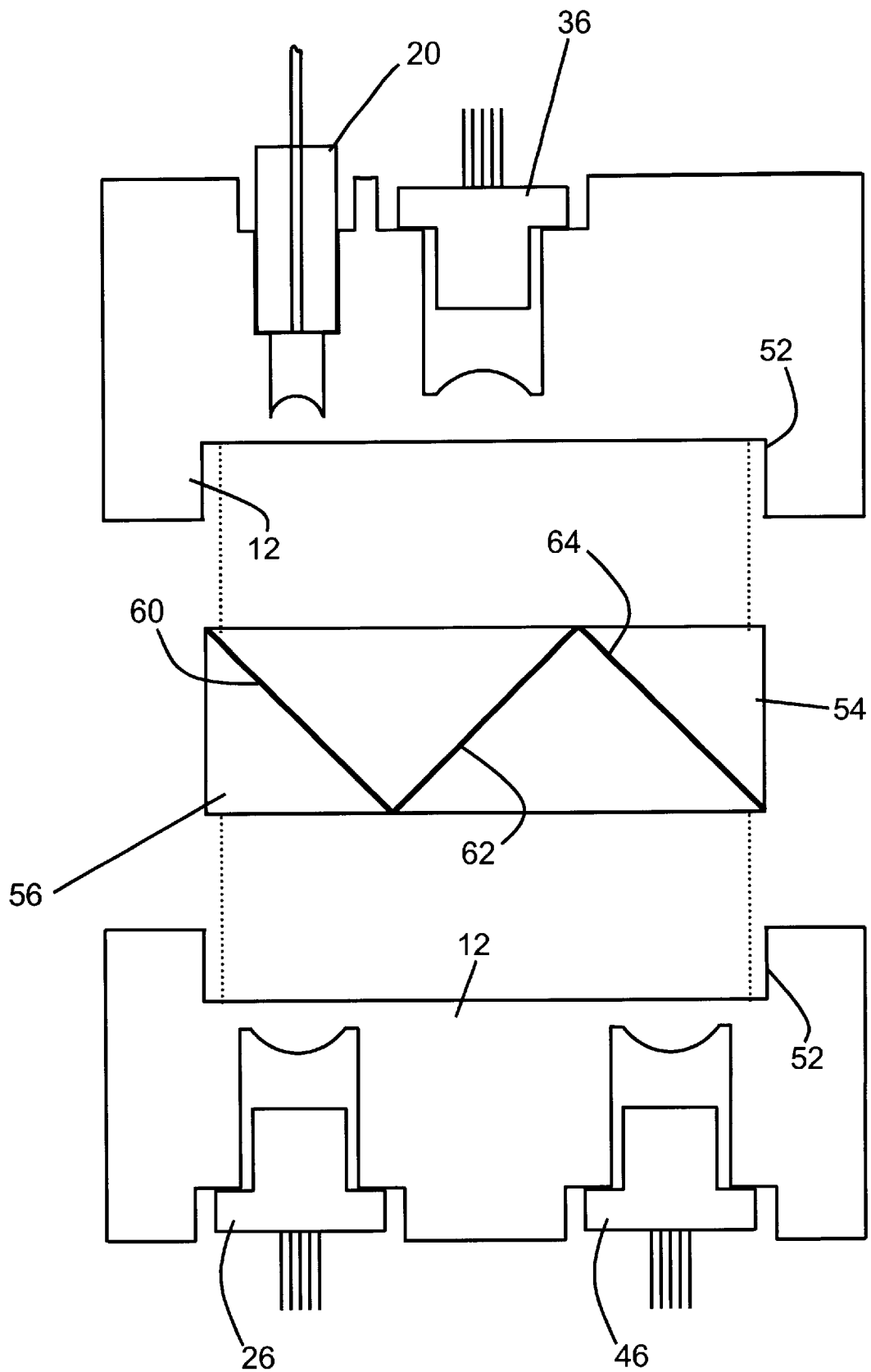
FIG. 1A is an exploded view of the filter subassembly and the transparent mounting structure of the device of FIG. 1.

The mounting structure 12 also integrally includes a filter subassembly alignment feature 52. A filter subassembly 54 is fitted into and aligned in the filter subassembly alignment feature 52. FIG. 1A shows an exploded view of the filter subassembly 54 being fitted into the filter subassembly alignment feature 52. Preferably, the alignment of the filter subassembly 54 is passive. The filter subassembly includes at least one prism 56. As used herein, a prism is defined as a transparent body with at least one substantially flat face. The prisms are preferably formed from glass. The use of glass prisms is advantageous in that glass materials tend to have much lower optical losses at optical communications wavelengths than polymeric materials. Further, glass materials tend to have much lower thermo-optic and thermal expansion coefficients than polymeric materials. The prisms preferably have a refractive index substantially equal (within about 0.01) to the refractive index of the mounting structure.

The filter subassembly further includes a first interference filter 60 selective between the transmitted wavelength band and the received wavelength band. An interference filter may be said to be selective between two wavelength bands if it substantially reflects (>90%) light of one of the wavelength bands, and substantially transmits (>90%) light of the other wavelength band. The first interference filter is deposited on one of the flat faces of one of the prisms. In the embodiment of FIG. 1, the first interference filter 60 is transmissive for the transmitted wavelength band, and reflective for the received wavelength band. The filter subassembly further includes a second interference filter 62 selective between the first sub-band and the second sub-band of the received wavelength band. The second interference filter 62 is likewise deposited on one of the flat faces of one of the prisms.

As would be apparent to the skilled artisan, the first and second interference filters are sufficient to substantially separate the three wavelength bands used in the present device. However, the embodiment shown in FIG. 1 also includes a third interference filter 64 deposited on one of the flat faces of the prisms. The third interference filter 64 is selective between the first sub-band and the second sub-band of the received wavelength band. Ideally, this third interference filter would also separate any scattered transmitted signal from the second received signal. While not completely necessary, the third interference filter will decrease the noise detected in the second receiver, increasing the quality of the information carried by the second detected optical signal. The interference filters may be bandpass filters, or may be edge filters. For example, for use with the exemplary communication system described above, the first interference filter may be an edge filter transmissive at wavelengths below 1400 nm, and reflective at wavelengths above 1430 nm; and the second interference filter may be an edge filter reflective at wavelengths below 1520 nm and transmissive at wavelengths above 1540 nm.

Figure 2:
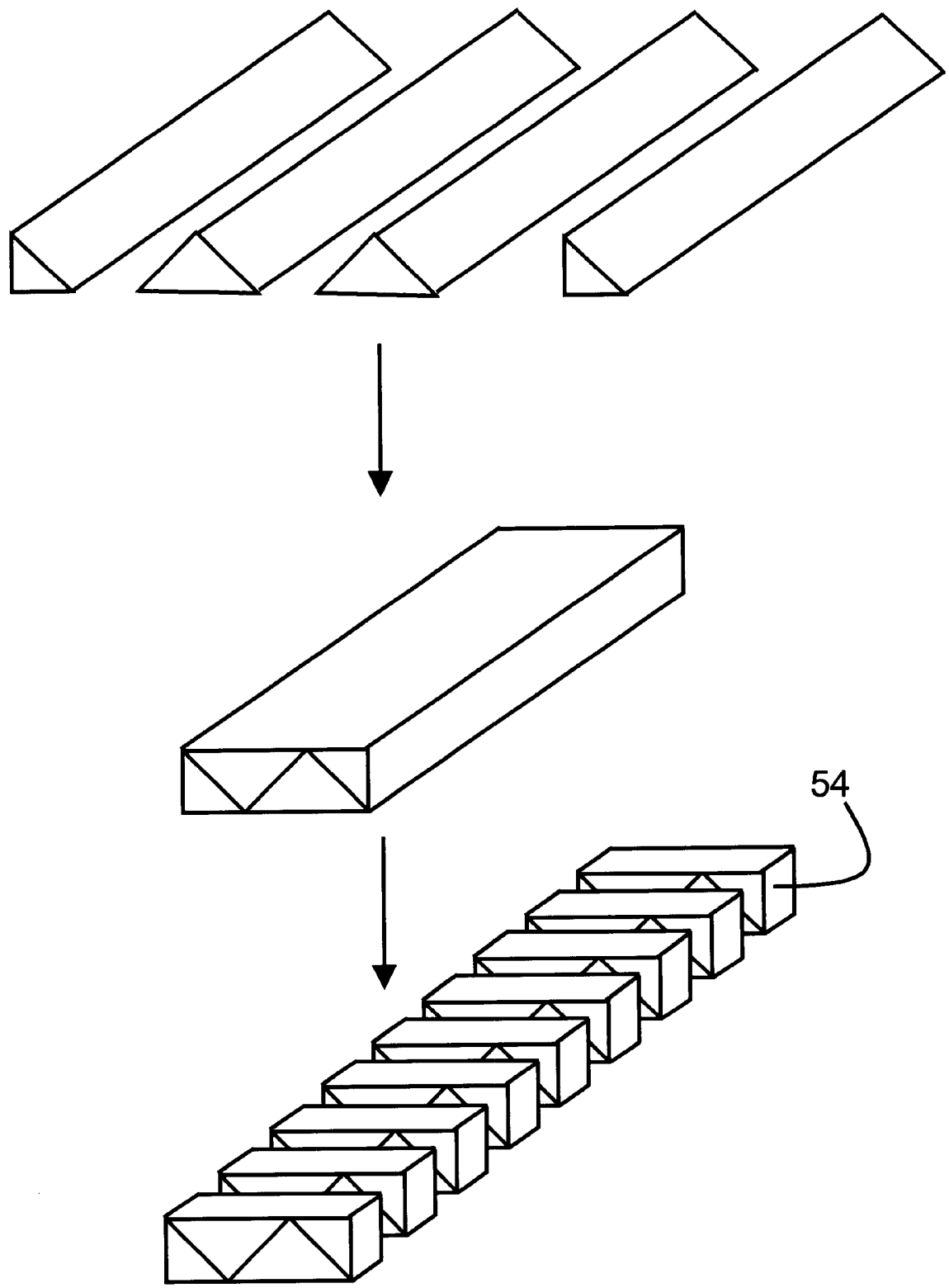
FIG. 2 is a schematic of a fabrication method for a filter subassembly for use with the present invention.

The prisms are assembled into a filter subassembly 54 shaped to fit into the filter subassembly alignment feature 52. Batch processing may be used to assemble the filter subassembly. Long glass prisms may be individually coated with interference filters using methods known to the person of skill in the art. The coated long prisms may be assembled using an adhesive, as shown in FIG. 2. The adhesive preferably has a refractive index substantially equal to the refractive index of the prisms. The long prism assembly may optionally be polished, then diced to give individual filter subassemblies 54.

The filter subassembly 54 is held in the filter subassembly alignment feature 52, and can be held in place with an adhesive. Preferably, the adhesive fills any space between the filter subassembly 54 and the mounting structure 12, and has a refractive index substantially equal to the refractive index of the prisms.

Optical transceiver 10 operates to couple a transmitted optical signal from the optical signal source 26 to the end 19 of the input optical fiber 18; a first detected optical signal from the end 19 of the input optical fiber 18 to the first receiver 36; and a second detected optical signal from the end 19 of the input optical fiber 18 to the second receiver 46. Thus, the filter subassembly 54 must be assembled and positioned such that the first interference filter 60 couples the transmitted optical signal from the optical signal source 26 to the end 19 of the input optical fiber 18. In order to avoid additional reflection and misalignment loss, the transmitted optical signal is not substantially reflected by any element other than the first interference filter 60. As described above, the position of the optical signal source 26 may be optimized in an active alignment process in order to maximize the coupling of the transmitted optical signal. In the embodiment of FIG. 1, the transmitted optical signal is transmitted by the first interference filter 60, and coupled through input collimating element 16 to the end 19 of the input optical fiber. In this embodiment, any small amount of transmitted optical signal reflected by the first interference filter 60 is reflected away from the rest of the device. Faces of the block that are not in the optical path may be coated, for example with black paint, so as to absorb this spurious signal, as will be appreciated by the person of skill in the art.

The filter assembly 54 must likewise be assembled and positioned such that the first interference filter and the second interference filter couple the first received optical signal from the end 19 of the optical fiber 18 to the first receiver 36. The first received optical signal is not substantially reflected by any element other than the first and second interference filters 60 and 62. As described above, the position of the first receiver 36 may be optimized in an active alignment process in order to maximize the coupling of the optical signal. In the embodiment of FIG. 1, the first detected optical signal is reflected by both the first and the second interference filters 60 and 62 and is coupled through the collimating element 34 to the first receiver 36.

The filter assembly 54 must further be assembled and positioned such that the first interference filter and the second interference filter couple the second received optical signal from the end 19 of the optical fiber 18 to the second receiver 46. The second received optical signal may undergo reflections in addition to any reflections by the first and second interference filters. As described above, the position of the second receiver 46 may be optimized in an active alignment process in order to maximize the coupling of the optical signal. In the embodiment of FIG. 1, the second detected optical signal is reflected by the first interference filter 60, transmitted by both the second interference filter 62, and reflected by the third interference filter 64, and is coupled through the collimating element 44 to the second receiver 46.

Figure 3:
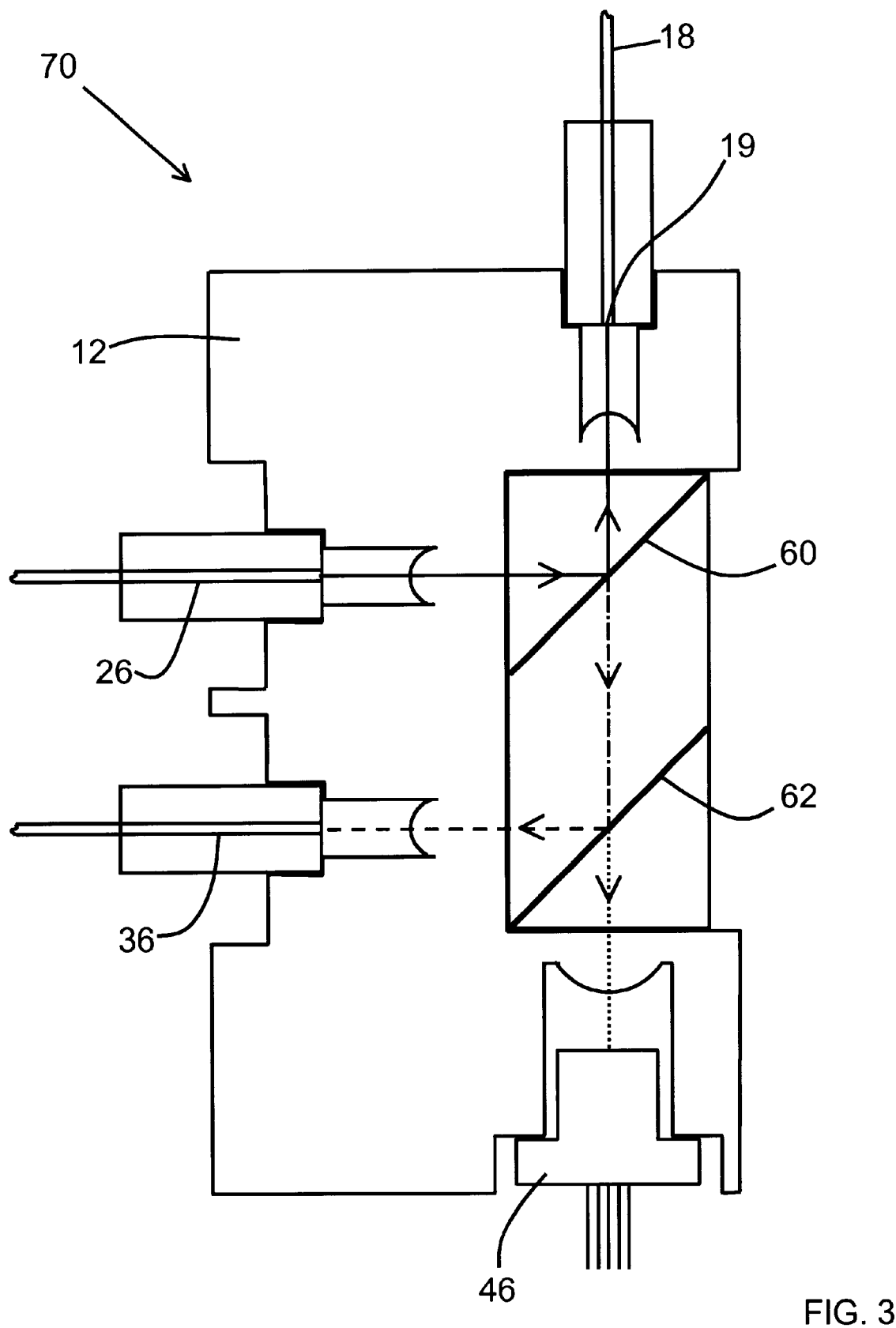
FIG. 3 is a cross-sectional view of an optical transceiver having two interference filters.

As the skilled artisan will recognize, other device configurations are possible within the scope of the present invention. A second exemplary embodiment of an optical transceiver in accordance with the present invention is shown in FIG. 3. The mounting structure 12 of the optical transceiver 70 is of one piece. In this exemplary device, the optical signal source 26 is a ferrule-held optical fiber coupled to an external laser source (not shown). The first interference filter 60 reflects the transmitted optical signal, coupling it from the optical signal source 26 to the end 19 of the input optical fiber 18. The first received optical signal is transmitted by the first interference filter 60, reflected by the second interference filter 62, and coupled to the first receiver 36, while the second detected optical signal is transmitted by both interference filters 60 and 62, and coupled to the second receiver 46. In this exemplary embodiment, the first receiver 36 is a ferrule-held multimode optical fiber, which transmits the first optical signal to an external optical device (not shown). As the ferrule-held multimode optical fiber has a well-known geometry and relatively lax alignment tolerances, this element may be passively aligned.

Figure 4:
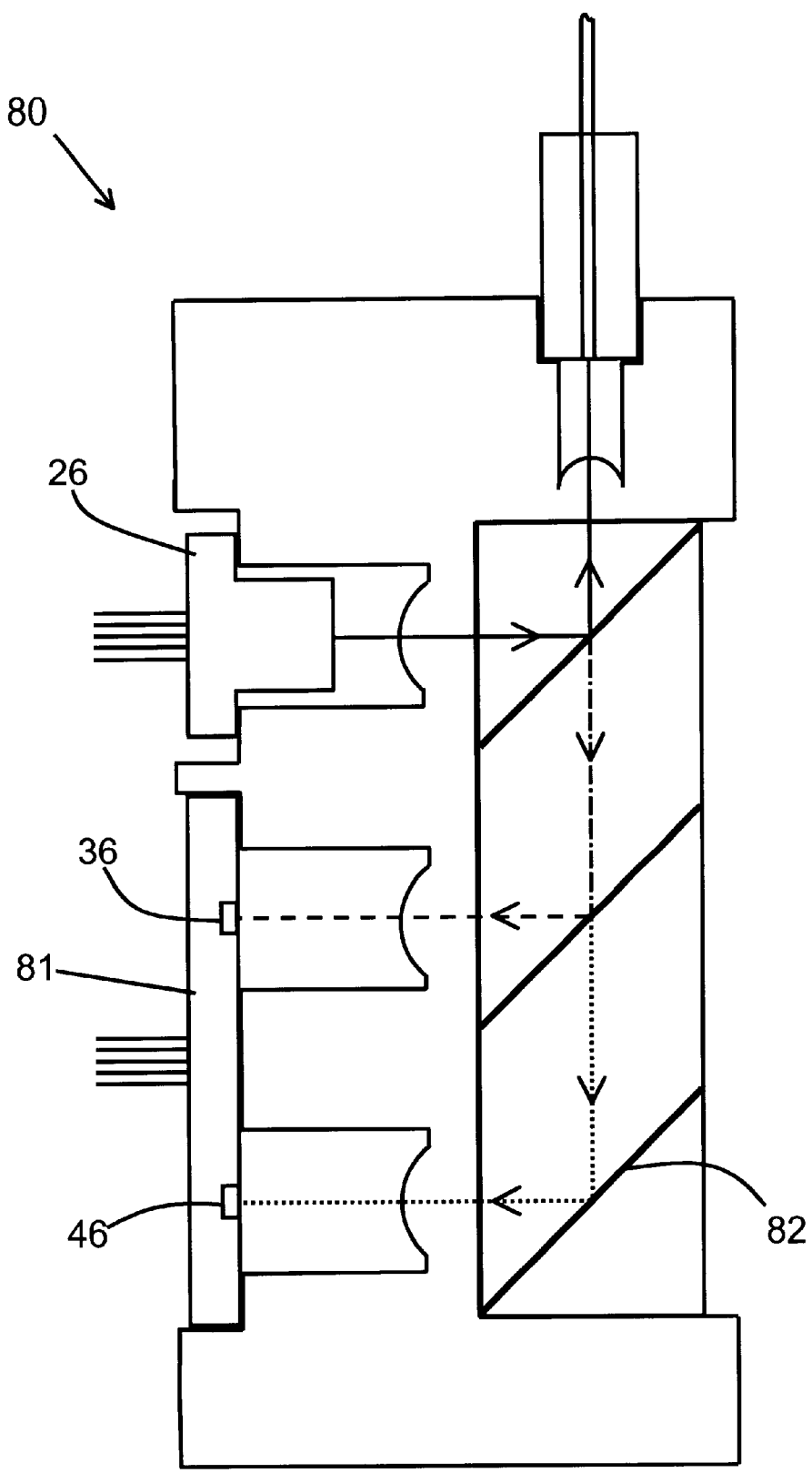
FIG. 4 is a cross-sectional view of an optical transceiver adapted to be controlled by a single electronic circuit board.

In a third exemplary embodiment of the present invention, shown in cross-sectional view in FIG. 4, the optical signal source 26 and the receivers 36 and 46 are all on the same face of the optical transceiver 80, so that all three may be interfaced with a common electronic circuit board (not shown). The receivers 36 and 46 are integrated into a single array 81; thus, two transceiver elements are held in a single transceiver element alignment feature. In this embodiment, the filter subassembly includes reflector 82, which serves to couple the second detected optical signal from the second interference filter 62 to the second receiver 46. The reflector may be an interference filter, as previously described in connection with FIG. 1. Since the first and second interference filters are putatively sufficient to separate the second received optical signal from the other optical signals propagating in the device, the reflector may be a simple mirror, such as a layer of silver deposited on the prism.

Figure 5:
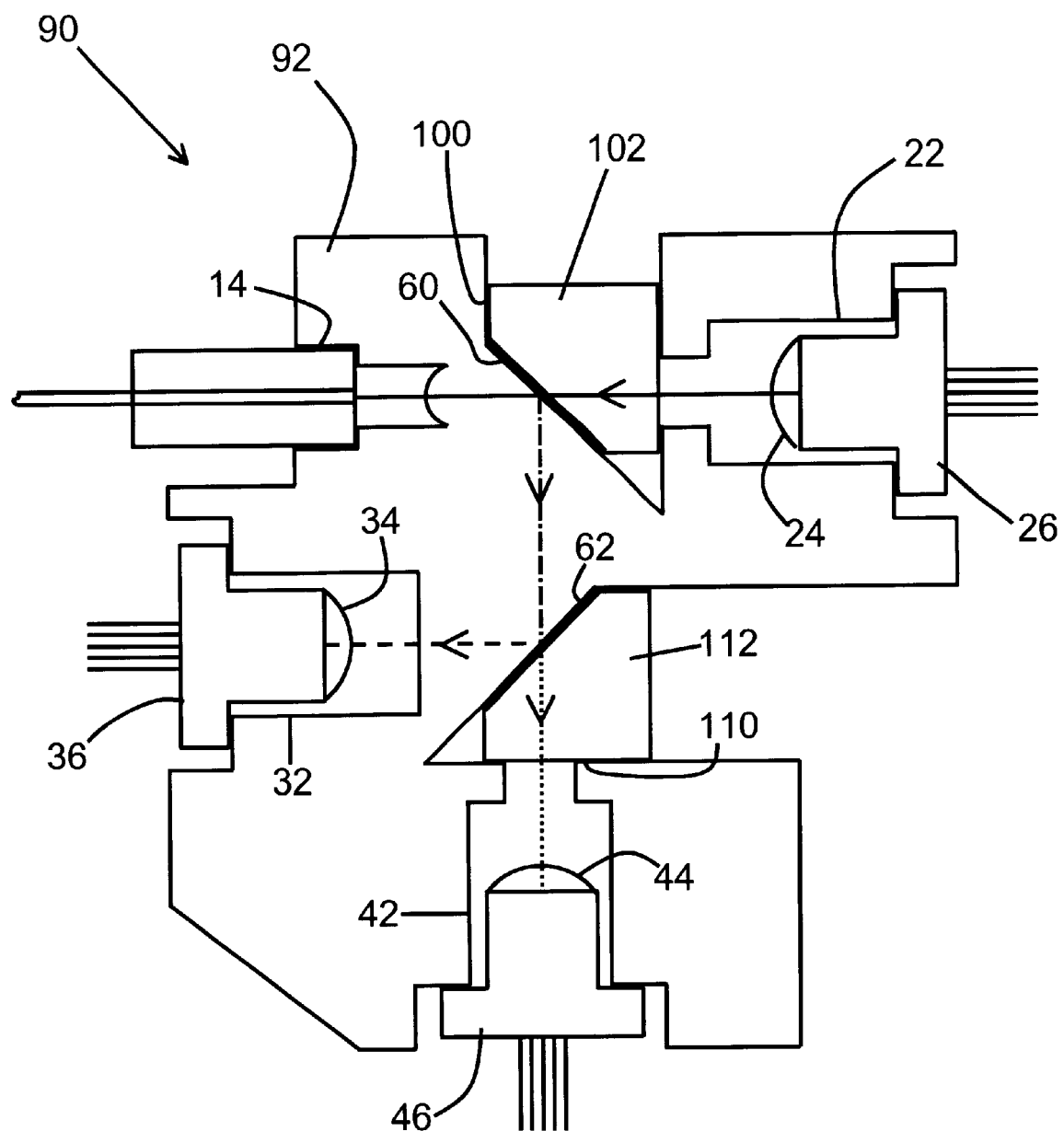
FIG. 5 is a cross-sectional view of an optical transceiver with separate interference filters.

In other preferred embodiments of the invention, interference filters are not preassembled into a filter subassembly, but are individually aligned in separate alignment structures, as shown in FIG. 5. Optical transceiver 90 is built on transparent mounting structure 92, which includes a ferrule alignment feature 14, a optical signal source alignment feature 22, and first and second receiver alignment features 32 and 42. Mounting structure 92 further includes first and second interference filter alignment features 100 and 110. First and second interference filters 60 and 62 are deposited on prisms 102 and 112, and are passively aligned and held in the interference filter alignment features 100 and 110. Optical signal source 26 and receivers 36 and 46 are all optoelectronic devices with collimating elements (24, 34 and 44, respectively) integrated with the package. The alignment features 22 and 42 are formed such that optical signals do not propagate through the mounting structure between the corresponding the collimating element and prisms.

Figure 6:
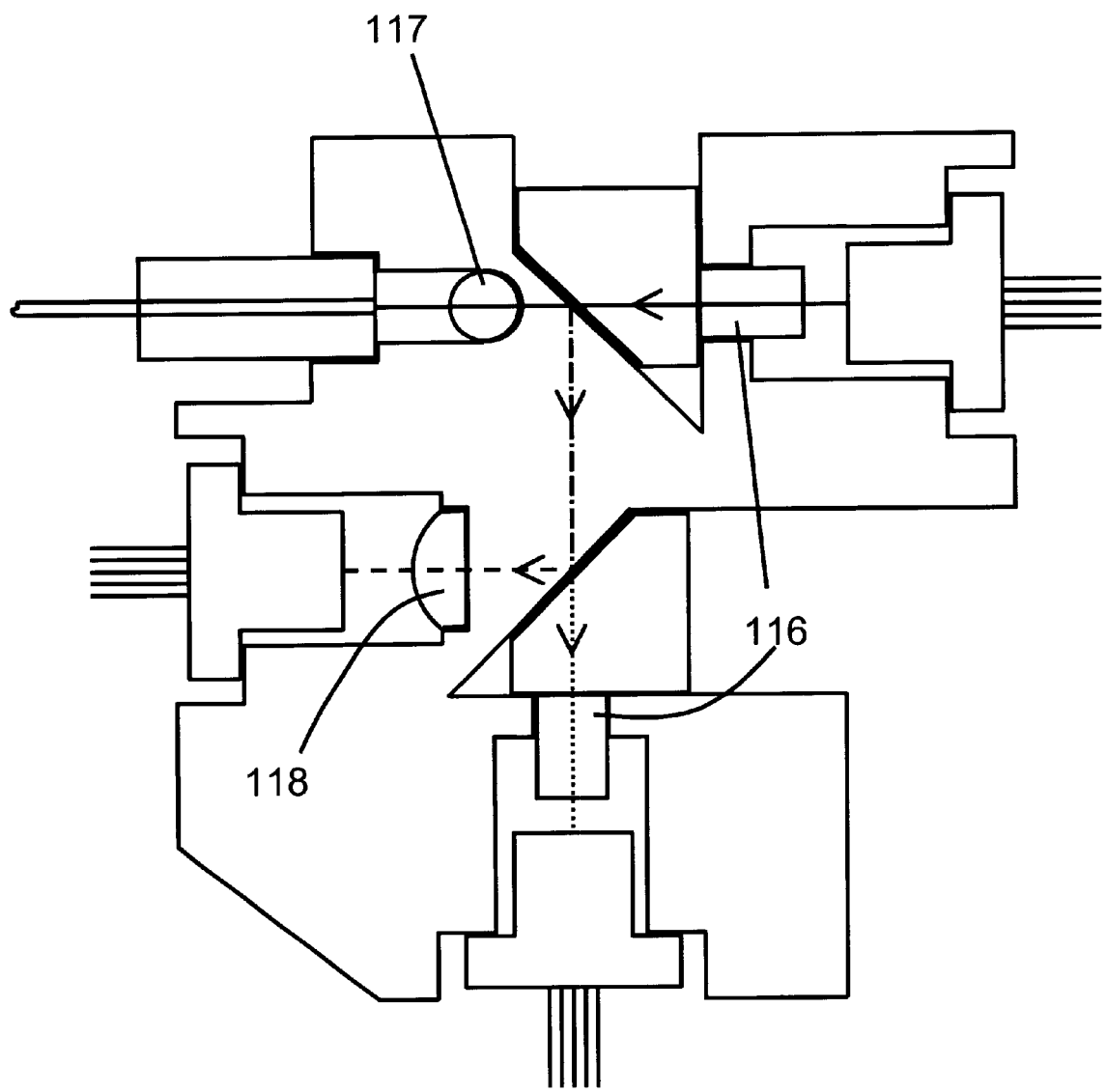
FIG. 6 is a cross-sectional view of an optical transceiver having alternative lensing elements.

Alternatively, as shown in FIG. 6, the lensing elements may have other structures known to the skilled artisan. For example, the lensing elements may be GRIN lenses (116), ball lenses (117), or plano-convex lenses (118), and may be held in the mounting structure by corresponding lens element alignment features.

Figure 7:
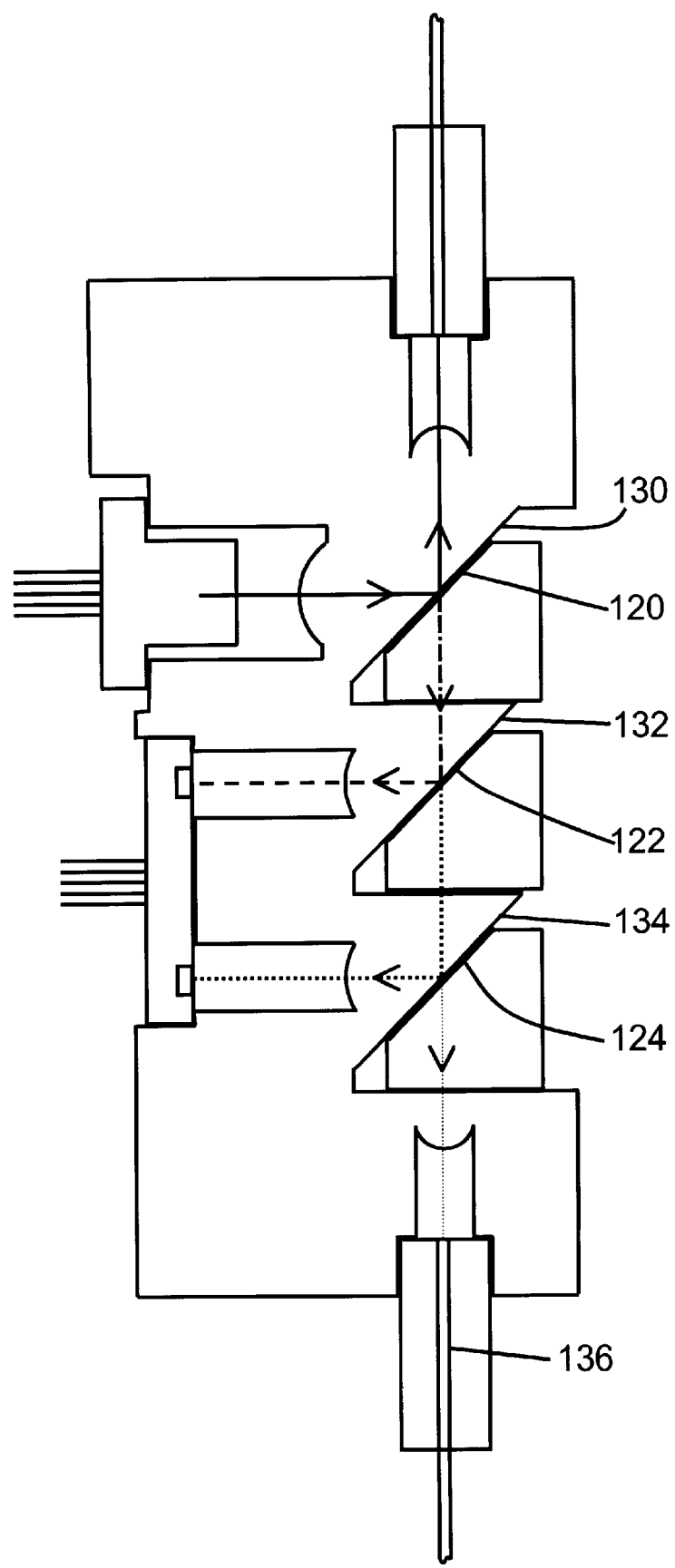
FIGS. 7 and 8 are cross-sectional views of optical transceiver having separate interference filters and an output optical fiber.

In the exemplary device shown in FIG. 7, three prism-deposited interference filters 120, 122, and 124 are held in alignment features 130, 132 and 134. The third interference filter 124 reflects the second optical signal, and transmits a third optical signal, which is coupled to an output fiber 136 to be transmitted to an external optical device (not shown). As in the embodiment of FIG. 4, all of the optoelectronic elements are on a common face of the device, simplifying integration with control electronics.

Figure 8:
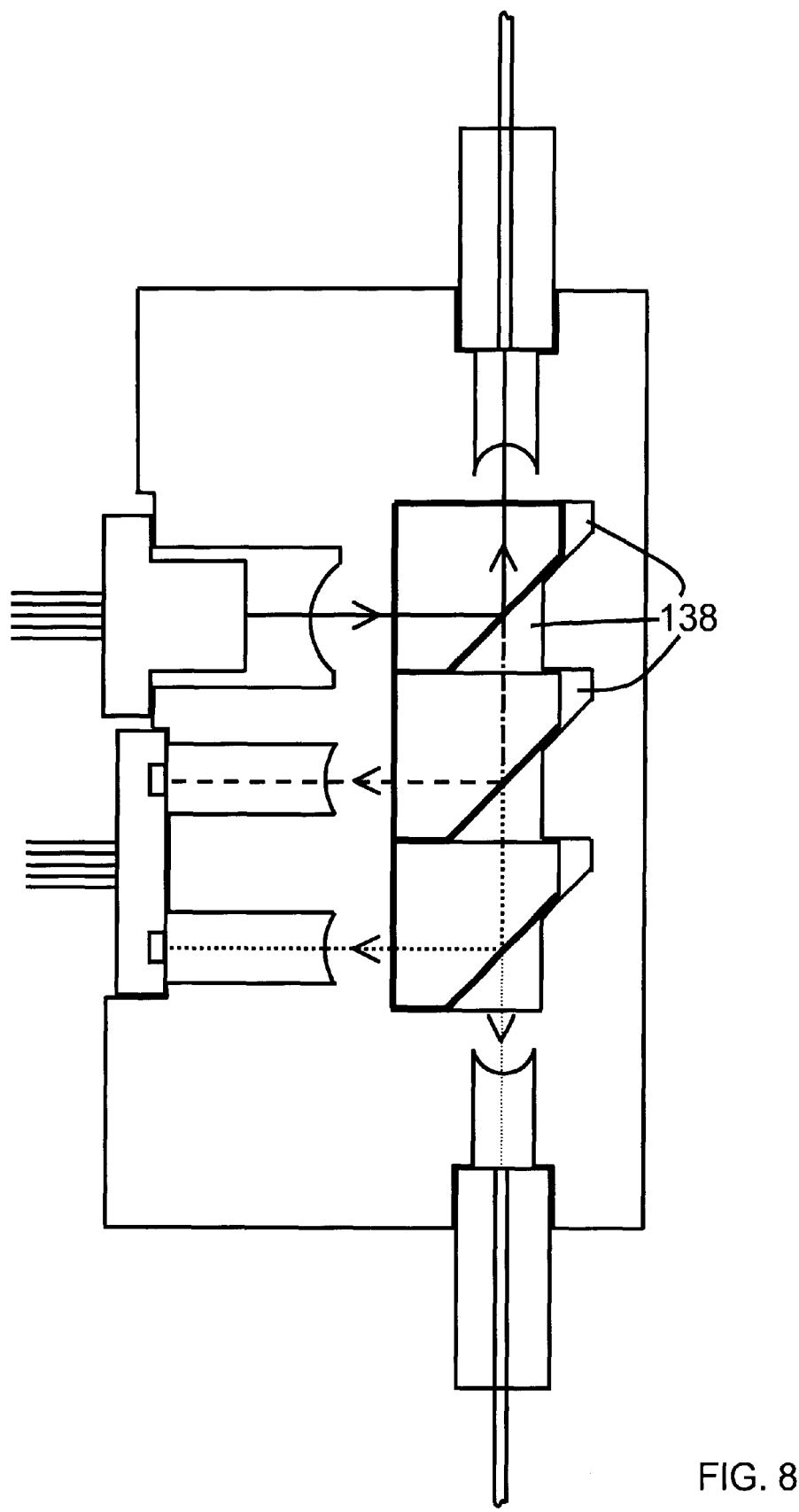

The device shown in cross-section in FIG. 8 is similar to the device of FIG. 7, but has the prisms held so that the reflections by the interference filters occur within the prism. In this configuration, optical signals must traverse additional prism/mounting structure boundaries, and will therefore incur some additional reflection loss, though these losses can be reduced by index matching the material of the prisms to the material of the mounting structure. The voids 138 left in the mounting structure can be filled with an index matching adhesive to further reduce reflection loss. In some cases, the configuration of FIG. 8 may be advantageous, as it increases the ratio of the path length of the optical signals in the prism to the path length in the mounting structure, and reduces the path length in the mounting structure. In the embodiment of FIG. 8, prisms are inserted into the device in a direction perpendicular to the plane of the drawing.

Figure 9:
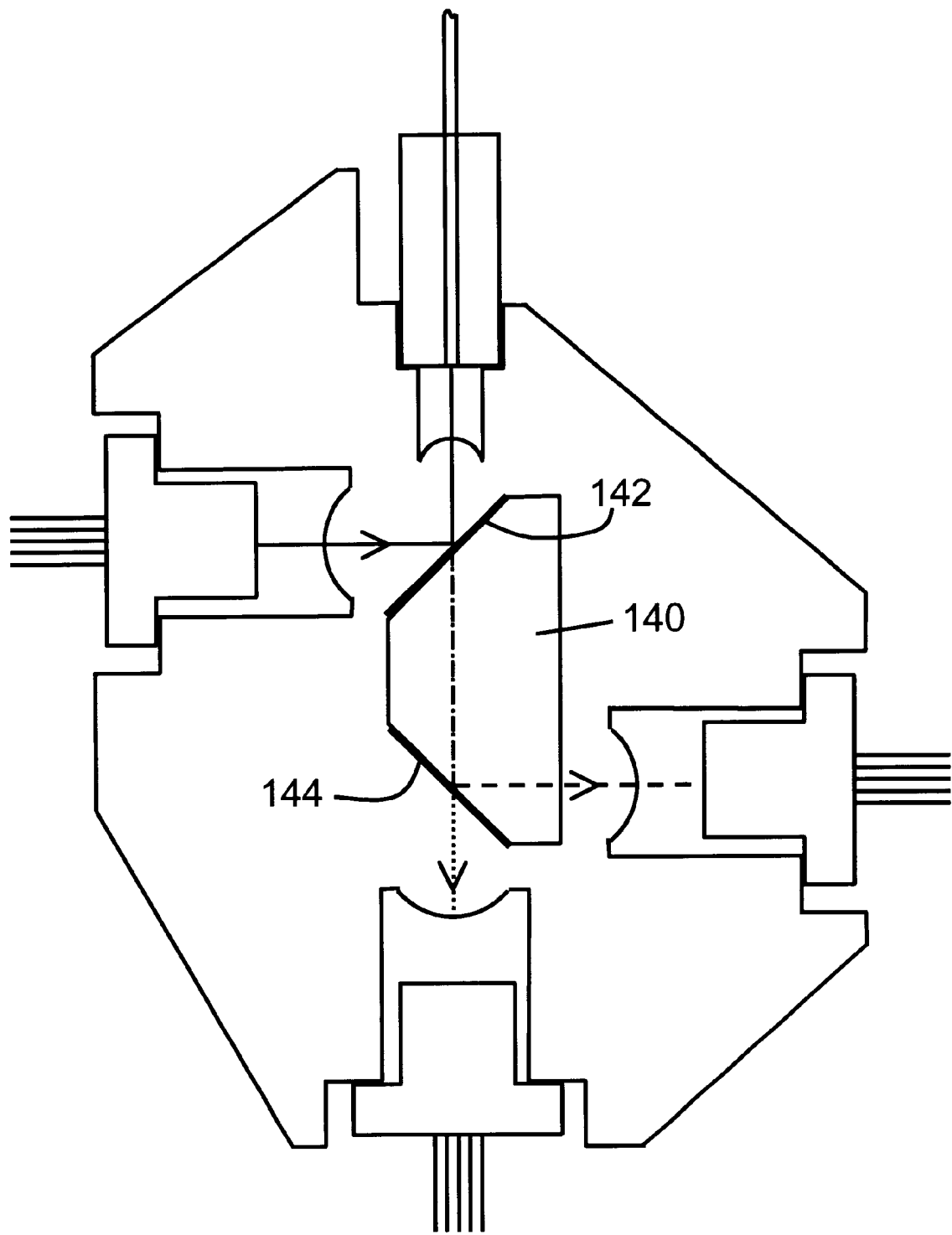
FIG. 9 is a cross-sectional view of an optical transceiver including a prism having two interference filters.

In order to simplify fabrication and alignment, more than one interference filter may be deposited on a single prism. FIG. 9 is a cross-sectional view of a device including a single prism 140 with two different interference filters. The first interference filter 142 is selective between the transmitted wavelength band and the first sub-band of the received wavelength band, while the second interference filter 144 is selective between the first and second sub-bands of the received wavelength band. As described in connection with FIG. 8, prisms are inserted into the device in a direction perpendicular to the plane of the drawing. Techniques for coating a single prism with multiple interference filters are well known in the art, and are not described in detail here.

Figure 10:
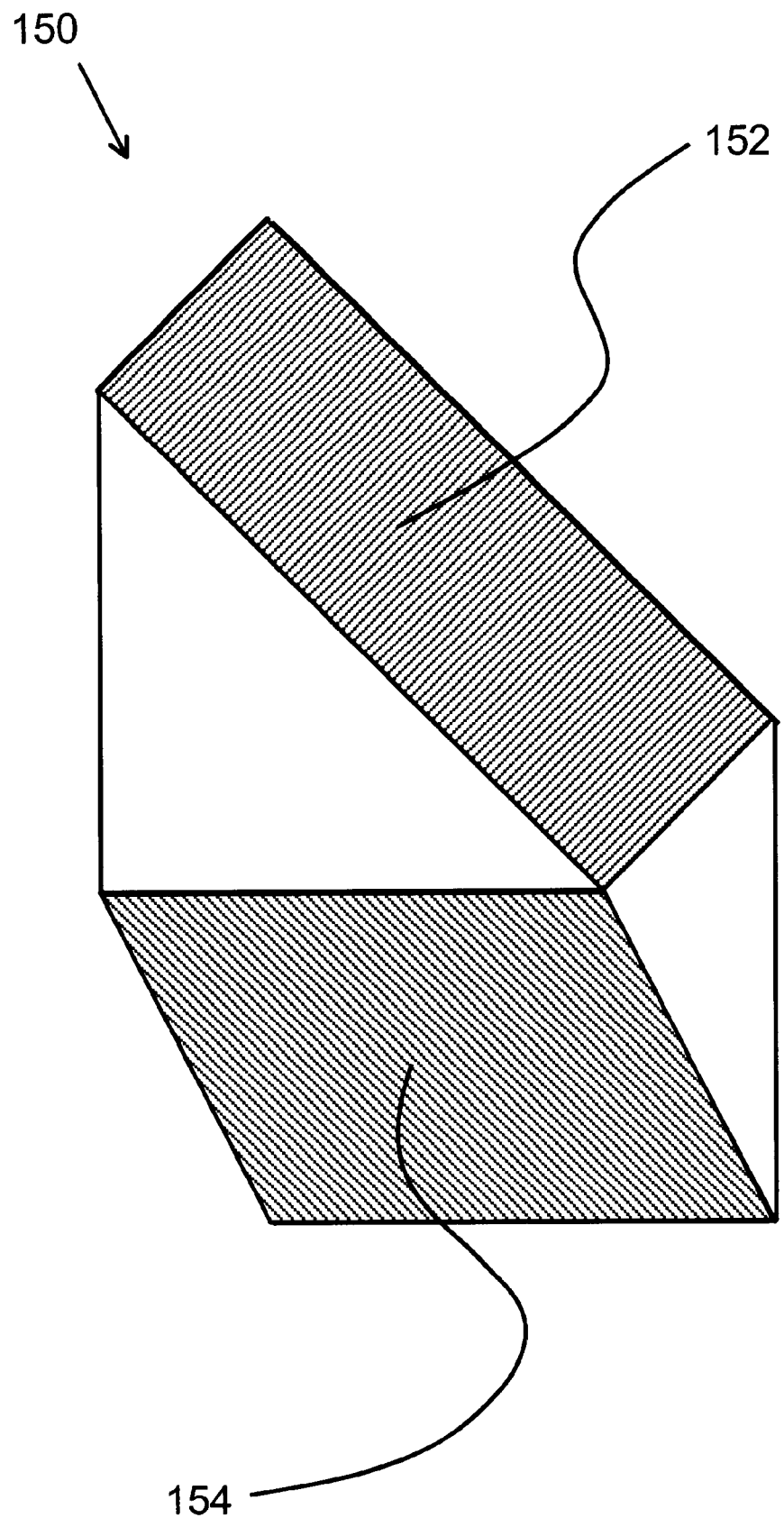
FIG. 10 is a perspective view of a prism suitable for use in a device having non-coplanar optical paths.

In the exemplary embodiments described above in connection with FIGS. 1–9, the input optical fiber, the optical signal source and the receivers were all substantially coplanar, and the optical paths were substantially in the same plane. As the person of skill in the art will appreciate, devices of the present invention may be constructed with non-coplanar optical paths and arrangements of elements. For example, shown in FIG. 10 is prism 150, which is coated with interference filters 152 and 154. This prism may be used to construct a device in which the optical paths are not coplanar.

Figure 11:
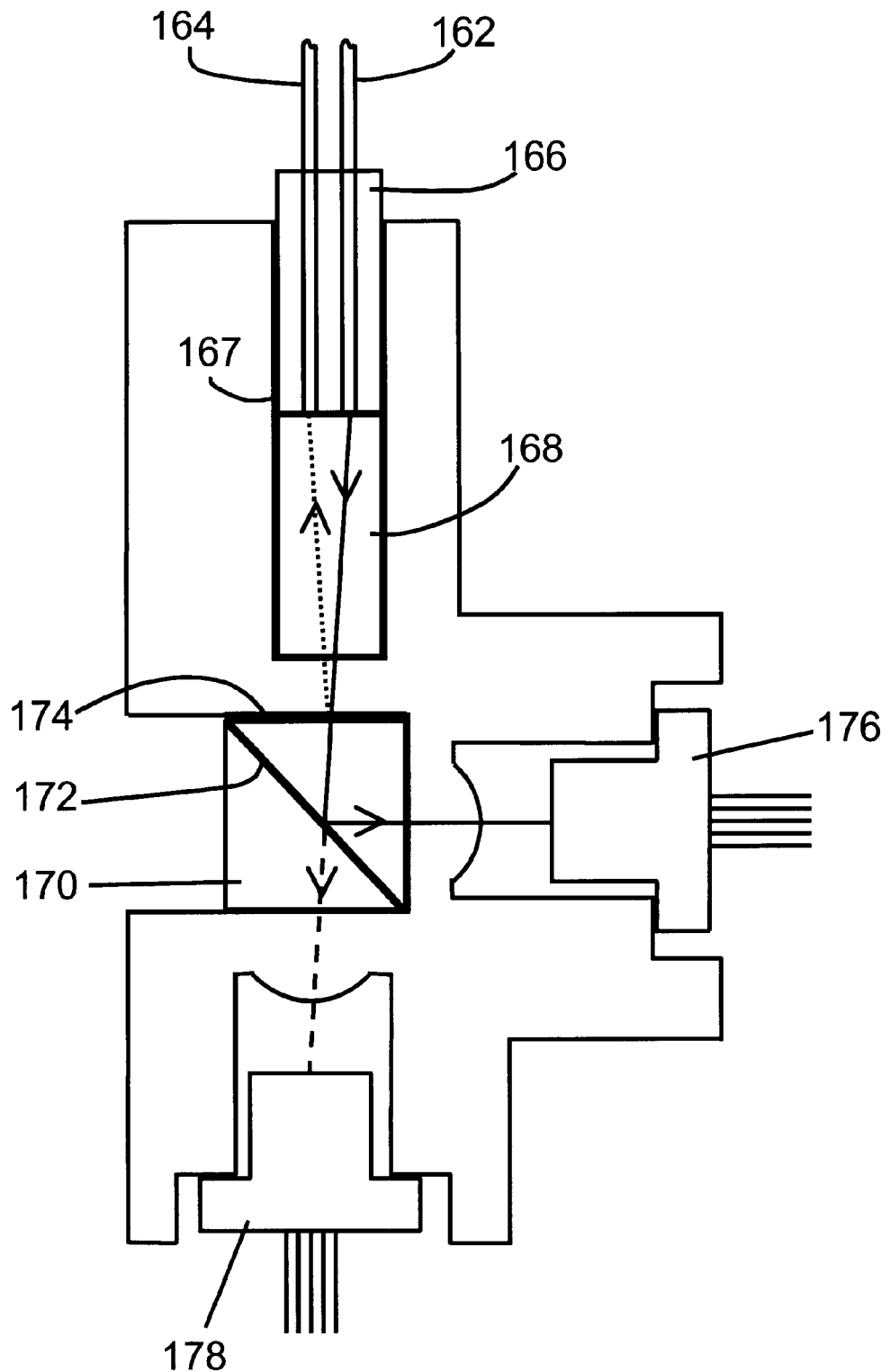
FIG. 11 is a cross-sectional view of a demultiplexer in accordance with the present invention.

As noted above, devices of the present invention may be purely multiplexers or demultiplexers. An exemplary demultiplexer in accordance with the present invention is shown in FIG. 11. In this device, two transceiver elements, optical fibers 162 and 164, are held in a single ferrule 166, which is held in a single transceiver element alignment feature 167. Optical fiber 162 is a single mode fiber, and emits three optical signals, each having a wavelength within a unique wavelength band, while optical fiber 164 is a multimode fiber. A GRIN lens 168 is also held in the alignment feature, operatively coupled to both optical fibers 162 and 164. The combination of a GRIN lens with two optical fibers held in a single ferrule is known in the art, and is described in U.S. Pat. No. 5,859,940, which is incorporated herein by reference. The device also includes a filter subassembly 170, which includes interference filters 172 and 174, and photodiode detectors 176 and 178.

The three optical signals emanating from optical fiber 162 are collimated by GRIN lens 168, propagate through the mounting structure, and impinge upon the first interference filter 172, which is deposited on an exterior face of the filter subassembly. Interference filter 172 reflects the first optical signal, and transmits the second and the third optical signals. The second interference filter 174 is selective between the second and the third optical signals, which are respectively coupled to the first and the second photodiode detectors 176 and 178.

In many of the exemplary devices described above, prisms having deposited interference filters are assembled into a mounting structure. The devices include at least one input and at least one output for an optical signal. The material of the mounting structure may be chosen by the skilled artisan to be transparent to the optical signal as well as be easily formable into the somewhat complex shape of the mounting structure. For example, the mounting structure can be molded from a polymeric material, and can include features such as collimating elements as well as alignment features for various optical and optoelectronic elements. Alternatively, the mounting elements may be formed from a glass material. The mounting elements can be fabricated by methods such as injection molding, casting from a mold, diamond turning, precision machining, optical micromachining, or other methods familiar to the skilled artisan.

The material of the prisms may be selected to have a very low optical loss as well as low thermo-optic and thermal expansion coefficients. As the shapes of the prisms are relatively simple, formability is not a key requirement. Prisms may be, for example, ground and polished from a glass material before deposition of the interference filters. Alternatively, prisms may be cast from a mold, or fabricated by other methods known to the person of skill in the art.

In the present invention, it is desirable to have a substantial fraction of the path length traversed by the optical signal be in the material of the prisms, thus minimizing the path length of the optical signals in the transparent mounting structure. As the material of the prisms (e.g. glass) may have a lower optical loss and lower thermo-optic and thermal expansion coefficients than the material of the mounting structure, maximizing the use of prism material in the device will increase the performance of the device, especially when the device is used over a large temperature range. The use of prisms formed from glass materials may also decrease the effective expansion coefficient of any polymeric materials adhered to the prisms. Suitable devices have, for at least one of the optical signals, a ratio of the path length of the optical signal in the prisms to the path length of the optical signal in the mounting structure of at least about 0.5. Preferably, for at least one of the optical signals, the ratio of the path length of the optical signal in the prisms to the path length of the optical signal in the mounting structure is at least about 1.

Figure 12:
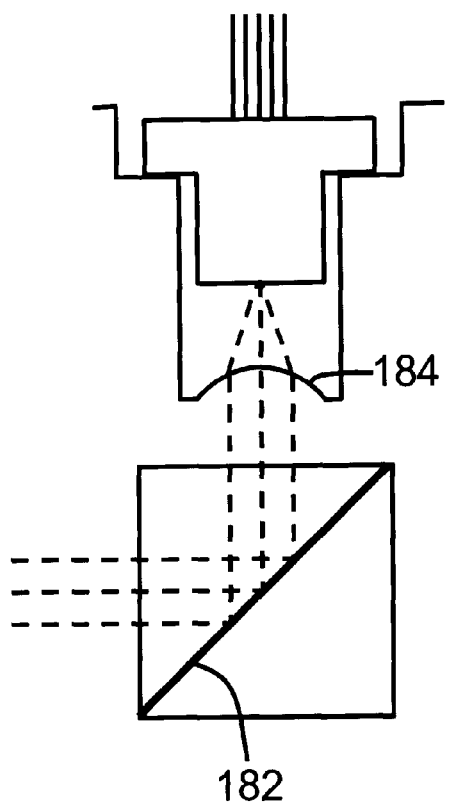
FIGS. 12 and 13 are cross-sectional views of the effects of thermal expansion on the devices of the present invention.
Figure 13:
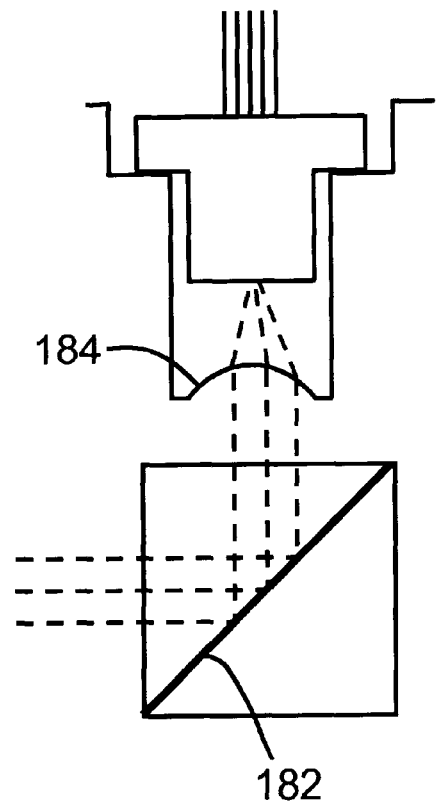

For use in fiber to the home applications, it is desirable that devices have a large working temperature range. In devices of the present invention, if the adhesive affixing the prisms or prism subassembly is somewhat elastic and allows the parts to expand relative to one another, the optical effect of thermal expansion is minimized, as shown in FIGS. 12 and 13. FIG. 12 shows a device working at room temperature. The optical beam reflecting off of interference filter 182 is aligned to the center of the lens element 184. In FIG. 13, thermal expansion has caused the interference filter 182 to move relative to the lensing element 184, moving the optical beam relative to the lensing element. Use of a slightly oversized lensing element allows the full beam to be collected and focused onto the active area of the receiver. Large temperature fluctuations may cause a slight loss of focus at the receiver, but this will generally not seriously impair the function of the device. Preferred adhesives are able maintain adhesion over a wide temperature range, maintaining optical contact with the transparent mounting structure and the prisms. Use of athermal lensing elements, as described above, may also reduce the temperature dependence of device performance.

It will be apparent to those skilled in the art that various modifications and variations can be made to the present invention without departing from the spirit and scope of the invention. For example, the transparent molding structures, transceiver elements, prisms and interference filters described above may be combined by the skilled artisan in light of the present disclosure to give a multitude of useful optical devices. Thus, it is intended that the present invention cover the modifications and variations of this invention provided they come within the scope of the appended claims and their equivalents.

What is claimed is:

1. An optical device for use with at least one optical signal, each optical signal having a wavelength within a unique wavelength band, the optical device comprising:
    at least three transceiver elements, each transceiver element being operatively coupled to a lensing element, and each transceiver element emitting at least one of the optical signals, receiving at least one of the optical signals, or both;
    a filter subassembly having
        at least one prism, each prism having at least one substantially flat face, each prism being formed from a glass material; and
        at least one interference filter, each one of the interference filters being respectively deposited on one of the substantially flat faces of one of the prisms, each interference filter being selective between two of the unique wavelength bands of the optical signal; and
    a transparent mounting structure formed from a polymeric material, the transparent mounting structure having
        at least one transceiver element alignment feature, each transceiver element being held in one of the transceiver element alignment features, and
        a filter subassembly alignment feature, the filter subassembly being held in the filter subassembly alignment feature;
    wherein each optical signal is coupled from one of the transceiver optical elements to another of the transceiver optical elements by at least one of the interference filters, and
    wherein each lensing element is formed directly in the transparent mounting structure.

2. The optical device of claim 1 wherein each optical signal is not substantially reflected by any element other than the interference filters.

3. The optical device of claim 1 wherein each lensing element is a collimating element.

4. The optical device of claim 1 wherein for at least one optical signal, the ratio of the path length of the optical signal in the prisms to the path length of the optical signal in the mounting structure is at least about 0.5.

5. The optical device of claim 1 wherein for at least one optical signal, the ratio of the path length of the optical signal in the prisms to the path length of the optical signal in the mounting structure is at least about 1.

6. The optical device of claim 1 wherein each prism of the filter subassembly has a refractive index that is essentially the same as the refractive index of the mounting structure at wavelengths in the wavelength bands of the optical signals.

7. The optical device of claim 1 wherein the transceiver elements are individually selected from the group consisting of a single mode optical fiber, a multimode optical fiber, a planar waveguide, a laser, a light emitting diode and a photodiode detector.

8. The optical device of claim 1 wherein one of the transceiver elements is an optical fiber, the optical fiber being held by a ferrule, the ferrule being held in one of the transceiver alignment features of the mounting structure.

9. The optical device of claim 1 wherein the filter subassembly is held in the filter subassembly alignment feature of the mounting structure by an adhesive.

10. The optical device of claim 9 wherein the adhesive has a refractive index that is essentially the same as the refractive index of the mounting structure at the wavelengths of the emitted wavelength band and the detected wavelength band.

11. The optical device of claim 1, wherein the at least one optical signal includes an emitted optical signal having wavelengths within an emitted wavelength band, a first detected optical signal, the first detected optical signal having wavelengths within a first sub-band of a detected wavelength band, and a second detected optical signal having wavelengths within a second sub-band of the detected wavelength band; wherein the transceiver alignment features of the transparent mounting structure include a ferrule alignment feature, an optical signal source alignment feature, and at least one receiver alignment feature;
wherein the at least three transceiver elements include:
an input optical fiber having an end, the end of the input optical fiber being held in a ferrule, the ferrule being held in the ferrule alignment feature of the mounting structure,
an optical signal source held in the optical signal source alignment feature of the mounting structure, the optical signal source being operative at wavelengths in the emitted wavelength band,
a first receiver held in one of the receiver alignment features of the mounting structure, and
a second receiver held in one of the alignment features of the mounting structure;
wherein the at least one interference filter of the filter subassembly includes a first interference filter selective between the emitted wavelength band and the detected wavelength band, and a second interference filter selective between the first sub-band and the second sub-band of the detected wavelength band;
wherein the emitted optical signal is coupled from the optical signal source to the end of the optical fiber by the first interference filter, and is not substantially reflected by any element other than the first interference filter; and
wherein the first detected optical signal is coupled from the end of the optical fiber to the first receiver by the first interference filter and the second interference filter, and is not substantially reflected by any element other than the first interference filter and the second interference filter; and
wherein the second detected optical signal is coupled from the end of the optical fiber to the second receiver by the first interference filter and the second interference filter.

12. The optical device of claim 11 wherein the first interference filter is transmissive for the emitted wavelength band, and reflective for the detected wavelength band.

13. The optical device of claim 11 wherein the filter subassembly further includes a third interference filter deposited on one of the prisms, and wherein the second detected optical signal is coupled from the second interference filter to the second receiver by the third interference filter.

14. An optical device for use with a plurality of optical signals, each optical signal having a wavelength within a unique wavelength band, the optical device comprising:
at least three transceiver elements, each transceiver element being operatively coupled to a lensing element, and each transceiver element emitting at least one of the optical signals, receiving at least one of the optical signals, or both;
at least one prism, each prism having at least one substantially flat face, each prism being formed from a glass material;
at least one interference filter, each one of the interference filters being respectivelly deposited on one of the substantially flat faces of one of the prisms, each interference filter being selective between two of the unique wavelength bands of the optical signal;
a transparent mounting structure formed from a polymeric material, the transparent mounting structure having
at least one transceiver element alignment feature, each transceiver element being held in one of the transceiver element alignment features, and
at least one prism alignment feature, each prism being held in one of the prism alignment features,
wherein each optical signal is coupled from one of the transceiver elements to another of the transceiver elements by at least one of the interference filters, and
wherein each lensing element is formed in the transparent mounting structure.

15. The optical device of claim 14 wherein each optical signal is not substantially reflected by any element other than the interference filters.

16. The optical device of claim 14 wherein each lensing element is a collimating element.

17. The optical device of claim 14 wherein for at least one of the optical signals, the ratio of the path length of the optical signal in the prisms to the path length of the optical signal in the mounting structure is at least about 0.5.

18. The optical device of claim 14 wherein for at least one of the optical signals, the ratio of the path length of the optical signal in the prisms to the path length of the optical signal in the mounting structure is at least about 1.

19. The optical device of claim 16 wherein each prism has a refractive index that is essentially the same as the refractive index of the mounting structure at wavelengths in the wavelength bands of the optical signals.

20. The optical device of claim 14 wherein the transceiver elements are individually selected from the group consisting of a single mode optical fiber, a multimode optical fiber, a planar waveguide, a laser, a light emitting diode, and a photodiode detector.

21. The optical device of claim 20 wherein one of the transceiver elements is an optical fiber, the optical fiber being held by a ferrule, the ferrule being held in one of the transceiver alignment features of the mounting structure.

22. The optical device of claim 14 wherein the at least one interference filter is held in the mounting structure by an adhesive.

23. The optical device of claim 22 wherein the adhesive has a refractive index that is essentially the same as the refractive index of the mounting structure at the wavelengths of the wavelength bands of the optical signals.

24. The optical device of claim 14, wherein the plurality of optical signals includes an emitted optical signal having wavelengths within an emitted wavelength band, a first detected optical signal, the first detected optical signal having wavelengths within a first sub-band of a detected wavelength band, and a second detected optical signal having wavelengths within a second sub-band of the detected wavelength band;
wherein the transceiver alignment features of the transparent mounting structure include a ferrule alignment feature, an optical signal source alignment feature, and at least one receiver alignment feature;
wherein the at least three transceiver elements include:
an input optical fiber having an end, the end of the input optical fiber being held in a ferrule, the ferrule being held in the ferrule alignment feature of the mounting structure, an optical signal source held in the optical signal source alignment feature of the mounting structure, the optical signal source being operative at wavelengths in the emitted wavelength band, a first receiver held in one of the receiver alignment features of the mounting structure, and a second receiver held in one of the alignment features of the mounting structure;

wherein the at least one interference filter includes a first interference filter selective between the emitted wavelength band and the detected wavelength band, and a second interference filter selective between the first sub-band and the second sub-band of the detected wavelength band;

wherein the emitted optical signal is coupled from the optical signal source to the end of the optical fiber by the first interference filter, and is not substantially reflected by any element other than the first interference filter; and wherein the first detected optical signal is coupled from the end of the optical fiber to the first receiver by the first interference filter and the second interference filter, and is not substantially reflected by any element other than the first interference filter and the second interference filter; and wherein the second detected optical signal is coupled from the end of the optical fiber to the second receiver by the first interference filter and the second interference filter.

25. The optical device of claim 24 wherein the first interference filter is transmissive for the emitted wavelength band, and reflective for the detected wavelength band.

26. The optical device of claim 24 further comprising a third interference filter coupled to the mounting structure, and wherein the second detected optical signal is coupled from the second interference filter to the second receiver by the third interference filter.

* * * * *